Patented Apr. 26, 1932

1,855,856

UNITED STATES PATENT OFFICE

CHRISTIAN JOHANNES HANSEN, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

PRODUCTION OF FERTILIZERS

No Drawing. Application filed February 7, 1930, Serial No. 426,771, and in Germany July 1, 1929.

My invention refers to the treatment of gases resulting in the distillation of carbonaceous material, such as coal, with a view to recovering therefrom valuable constituents and more especially ammonia, hydrogen sulfide and cyanogen compounds for use in the production of fertilizers.

It is a particular object of my invention to provide means for producing fertilizers containing besides one or all the compounds mentioned above, or their conversion products, also phosphorus.

It has already been suggested to recover the ammonia from coal distillation gases and the like by washing same with solutions of phosphoric acid instead of the sulfuric acid formerly employed for the same purpose in order to directly recover ammonium compounds of phosphoric acid. The methods hitherto known do not however allow recovering simultaneously the hydrogen sulfide and cyanogen compounds from the gas in such manner as to yield commercial products.

On the other hand it has already been suggested to remove hydrogen sulfide and ammonia from gases containing same, more particularly from coal distillation gases, by means of washing liquors containing sulfur-oxygen compounds which are susceptible of reacting with hydrogen sulfide under the formation of thionates and more especially ammonium thiosulfate. One may for instance employ solutions of ammonium bisulfite, whereby ammonium thiosulfate is formed according to the equation

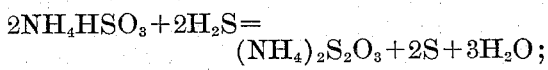
$$2NH_4HSO_3 + 2H_2S = (NH_4)_2S_2O_3 + 2S + 3H_2O;$$

or a solution of an ammonium salt of a polythionic acid such as tri-, tetra- or pentathionic acid, whereby both the hydrogen sulfide and ammonia are absorbed in accordance with equations of the type

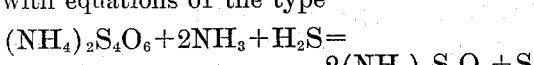
$$(NH_4)_2S_4O_6 + 2NH_3 + H_2S = 2(NH_4)_2S_2O_3 + S.$$

Still another method consists in washing the crude gas with a solution of a ferrous zinc or manganese thiosulfate, whereby hydrogen sulfide and ammonia are absorbed according to equations of the type

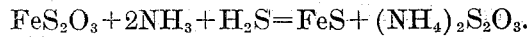
$$FeS_2O_3 + 2NH_3 + H_2S = FeS + (NH_4)_2S_2O_3.$$

The ferrous sulfide etc. may be treated either simultaneously or subsequently with sulfur dioxide in order to regenerate ferrous thiosulfate.

In all these methods and in other methods in which absorptive sulfur-oxygen compounds are used, the spent washing liquors contain the greater part of the total sulfur in the form of ammonium thiosulfate, which is perhaps accompanied by small amounts of ammonium polythionates, ammonium sulfite, ammonium bisulfite or complex compounds of ammonium thiosulfate and sulfur dioxide. In order to recover commercial ammonium sulfate from such liquors it has been suggested to treat same with sulfur dioxide so as to convert the ammonium thiosulfate into ammonium polythionates, and to decompose these latter compounds to form ammonium sulfate and free sulfur by heating the solution, preferably to temperatures above the boiling point of water, the operation being carried out in closed pressure resistive vessels.

I have now succeeded in recovering from the distillation gases the ammonia as well as the cyanogen compounds in the form of commercial ammonium salts of phosphoric acid, these products being mixed with a certain percentage of ammonium sulfate. I have also succeeded in completely removing the hydrogen sulfide contained in the gases and recovering therefrom the sulfur in a commercial form.

In practising my invention I first treat the gas according to one of the well known methods devised for this purpose with a solution of a salt of a sulfur-oxygen-acid (a polythionate, thiosulfate, etc.), which may also contain iron, manganese or zinc. By this treatment the gas is freed from ammonia and hydrogen sulfide. The cyanogen compounds in the gas may, if desired, be washed out simultaneously, for instance by means of the washing liquors serving for removing the ammonia and hydrogen sulfide, or by means of other washing liquors, the cyanogen compounds being recovered in the form of ammonium thiocyanate. On the washing liquors obtained in this treatment, which contain ammonium thionates in solution I then act with phosphoric acid, preferably at an elevated temperature.

The manner in which the process according to this invention is practised depends from the character of the washing liquors, which have been used for removing ammonia and hydrogen sulfide from the gases.

If the removal of ammonia and hydrogen sulfide from the gas is effected by means of a thionate solution, care should be taken, in order to recover a final product containing a high percentage of phosphoric acid, that the percentage of polythionates in the washing liquor be as low as possible in order to keep the formation of sulfate as low as possible, this formation being unavoidable when treating the washing liquor with phosphoric acid.

Whether the washing liquors also contain sulfite or bisulfite has no influence on the process. When operating with thionate solutions, the sulfur dioxide required for partly converting the thiosulfate into polythionates prior to the decomposition of the latter compounds into sulfate and sulfur is merely replaced by phosphoric acid.

In these cases I may proceed in two different ways.

If comparatively little phosphoric acid is used, for instance one to about two molecules per each three molecules thiosulfate, a mixture containing a great percentage of ammonium sulfate and little phosphate is ultimately obtained. In this case decomposition can be effected by heating either at ordinary pressure or at elevated pressure in closed vessels. No sulfur dioxide escapes and a mixture of ammonium sulfate, ammonium phosphate and sulfur is obtained.

I may for instance proceed as follows:

Example 1

2000 parts by weight of a spent washing liquor containing 1000 parts by weight ammonium thiosulfate dissolved therein is acted upon at about 180° C in a closed vessel with a 50% solution of phosphoric acid containing 220,3 parts of the acid. I thus obtain 288 parts pure molten sulfur and a mixture of 296,8 parts di-ammonium phosphate and 594 parts ammonium sulfate.

On the other hand if a greater quantity of phosphoric acid is used (one molecule or more per one molecule thiosulfate), only little ammonium sulfate is formed besides sulfur, a considerable quantity of sulfuric acid being liberated, which may be used for any desired purpose.

Example 2

To a 50% phosphoric acid solution containing 1323 parts phosphoric acid are added under stirring and heating in an autoclave 1000 parts ammonium thiosulfate in the form of a solution of about 50%. There are obtained 233 parts pure sulfur, 312 parts pure sulfur dioxide gas and a solution of monoammonium phosphate containing some free sulfuric acid. After expulsion of the sulfur dioxide there is added to this solution a watery solution containing 265 parts ammonia. There are obtained 1783 parts di-ammonium phosphate and about 135 parts ammonium sulfate.

The sulfur dioxide obtained in this process can be used for the regeneration of the washing liquors serving for the purification of the gas. The sulfur may partly be burnt to form sulfur dioxide if the quantity of sulfur dioxide resulting in the decomposition should not suffice for the regeneration of the washing liquor.

If ammonium thiocyanate shall be converted into commercial products together with the washing liquors from a thionate process, two ways are open. If the ammonium thiocyanate resulting in the process shall first be acted upon together with the total washing liquor to be decomposed, it is advantageous to use little phosphoric acid and to operate at a higher temperature, for instance 140–160° C. and at a correspondingly raised pressure in closed vessels. In this case one to about two molecules phosphoric acid are made to react with each three molecules of the thiosulfate to be decomposed. However in this reaction 0,5 molecules thiosulfate may be neglected per one molecule ammonium thiocyanate, which is present, 1,5 or more molecules phosphoric acid being added per molecule ammonium thiocyanate present in the solution. To the completely decomposed solution I may add ammonia, if desired.

Example 3

To a solution containing 1000 parts ammonium thiosulfate and 147 parts ammonium thiocyanate and about 1200 parts water are added 568 parts phosphoric acid in the form of a 50% solution and the mixture is then heated during 2–3 hours to 180–200° C. in a closed vessel. There are formed 371 parts pure molten sulfur, 84,9 parts carbon dioxide, and a watery solution containing 510 parts diammonium phosphate, 510 parts ammonium sulfate and 223,5 parts mono-ammonium phosphate. This latter compound can also be converted into di-ammonium phosphate by adding 32,8 parts ammonia in solution.

If ammonium thiocyanate is present, I may also operate, in order to obtain a final product containing only a low percentage of sulfate, in such manner that the ammonium thiocyanate is recovered separately. I then act on the greater part of the washing liquor free from cyanogen, which served for removing ammonia and hydrogen sulfide from the gas previously freed from cyanogen compounds, with a great quantity of phosphoric acid (Example 2), while acting on the smaller part of the washing liquor containing thiosulfate and on the ammonium thiocyanate with little phosphoric acid (Example 3). The final products obtained in these separate operations are then mixed with each other.

If considerable quantities of polythionates are present in the washing liquor, a correspondingly lower quantity of phosphoric acid shall be added, taking into consideration, that for instance one molecule polythionate is decomposed with two molecules thiosulfate or sulfite into sulfate and sulfur.

If the washing liquor also contains sulfite and bisulfite and the operation is carried through in open vessels allowing sulfur dioxide to escape, one molecule or more phosphoric acid is required to decompose one molecule sulfite or two molecules bisulfite. On the other hand, if operating in closed vessels, no addition of phosphoric acid is required for the bisulfite in solution, the quantity of phosphoric acid added being diminished in view of the fact, that for instance two molecules bisulfite if mixed with one molecule thiosulfate or sulfite will also yield sulfate and sulfur. The quantity of phosphoric acid to be added to a solution containing sulfite or sulfite and thiosulfate can thus easily be calculated.

If solutions are used containing iron, manganese or zinc, the metal should be removed before adding phosphoric acid, Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of treating distillation gases, containing ammonia and hydrogen sulfide to produce fertilizers comprising acting on such gas with a solution of a salt of a sulfur-oxygen acid susceptible to dissolve the ammonia and hydrogen sulfide in the gas and acting on the solution of the ammonium compounds thus obtained with phosphoric acid.

2. The method of treating distillation gases, containing ammonia and hydrogen sulfide to produce fertilizers comprising acting on such gas with a thionate solution to dissolve the ammonia and hydrogen sulfide in the gas and acting on the solution of the ammonium compounds thus obtained with phosphoric acid.

3. The method of treating distillation gases, containing ammonia and hydrogen sulfide to produce fertilizers comprising acting on such gas with a thiosulfate solution to dissolve the ammonia and hydrogen sulfide in the gas and acting on the solution of the ammonium compounds thus obtained with phosphoric acid.

4. The method of treating distillation gases, containing ammonia and hydrogen sulfide to produce fertilizers comprising acting on such gas with a sulfite solution to dissolve the ammonia and hydrogen sulfide in the gas and acting on the solution of the ammonium compounds thus obtained with phosphoric acid.

5. The method of treating distillation gases, containing ammonia and hydrogen sulfide to produce fertilizers comprising acting on such gas with a bisulfite solution to dissolve the ammonia and hydrogen sulfide in the gas and acting on the solution of the ammonium compounds thus obtained with phosphoric acid.

6. The method of treating distillation gases, containing ammonia, a cyanogen compound, and hydrogen sulfide to produce fertilizers comprising acting on such gas with a thionate solution to dissolve the ammonia and hydrogen sulfide in the gas and acting on the solution of the ammonium compounds of the sulfur-oxygen acids and ammonium thiocyanate thus obtained with phosphoric acid.

7. The method of treating distillation gases, containing ammonia, a cyanogen compound, and hydrogen sulfide to produce fertilizers comprising acting on such gas with a thiosulfate solution to dissolve the ammonia and hydrogen sulfide in the gas and acting on the solution of the ammonium compounds of the sulfur-oxygen acids and ammonium thiocyanate thus obtained with phosphoric acid.

8. The method of treating distillation gases, containing ammonia, a cyanogen compound, and hydrogen sulfide to produce fertilizers comprising acting on such gas with a sulfite solution to dissolve the ammonia and hydrogen sulfide in the gas and acting on the solution of the ammonium compounds of the sulfur-oxygen acids and ammonium thiocyanate thus obtained with phosphoric acid.

9. The method of treating distillation gases, containing ammonia, a cyanogen compound, and hydrogen sulfide to produce fertilizers comprising acting on such gas with a bisulfite solution to dissolve the ammonia and hydrogen sulfide in the gas and acting on the solution of the ammonium compounds of the sulfur-oxygen acids and ammonium thiocyanate thus obtained with phosphoric acid.

10. The method of treating distillation gases, containing ammonia, a cyanogen compound, and hydrogen sulfide to produce fertilizers comprising acting on such gas with a solvent to dissolve the ammonia and hydrogen sulfide in the gas, acting on part of the solution of the ammonium compounds of the sulfur-oxygen acids and ammonium thiocyanate thus obtained with phosphoric acid, the remaining solution being subjected to treatment to convert the thiocyanate into sulfate and sulfur.

In testimony whereof I affix my signature.

CHRISTIAN JOHANNES HANSEN.